United States Patent
Wilson et al.

(10) Patent No.: US 8,059,907 B2
(45) Date of Patent: Nov. 15, 2011

(54) CONSTANT VARIANCE FILTER

(75) Inventors: David L. Wilson, Pepper Pike, OH (US); Olivier Salvado, Shaker Heights, OH (US)

(73) Assignee: Case Western Reserve University, Cleveland, OH (US)

(*) Notice: Subject to any disclaimer, the term of this patent is extended or adjusted under 35 U.S.C. 154(b) by 1173 days.

(21) Appl. No.: 11/824,572

(22) Filed: Jun. 29, 2007

(65) Prior Publication Data

US 2008/0049998 A1    Feb. 28, 2008

Related U.S. Application Data

(60) Provisional application No. 60/817,310, filed on Jun. 29, 2006.

(51) Int. Cl.
*G06K 9/40* (2006.01)

(52) U.S. Cl. .......... 382/260; 382/131; 382/300

(58) Field of Classification Search .......... 382/128, 382/131, 260, 300
See application file for complete search history.

(56) References Cited

U.S. PATENT DOCUMENTS

| | | | | |
|---|---|---|---|---|
| 6,008,648 A | * | 12/1999 | Linz et al. | 324/309 |
| 6,073,042 A | * | 6/2000 | Simonetti | 600/420 |
| 7,187,794 B2 | * | 3/2007 | Liang et al. | 382/131 |
| 7,672,498 B2 | * | 3/2010 | Jellus | 382/131 |
| 2005/0041842 A1 | * | 2/2005 | Frakes et al. | 382/128 |
| 2005/0074158 A1 | * | 4/2005 | Kaufhold et al. | 382/132 |
| 2008/0292194 A1 | * | 11/2008 | Schmidt et al. | 382/217 |

* cited by examiner

*Primary Examiner* — Stephen Koziol
(74) *Attorney, Agent, or Firm* — Kraguljac & Kalnay, LLC (57) ABSTRACT

Systems and methods associated with a constant variance filter are described. One system embodiment includes a memory to store a spatially dependent filtered data set having a first degree of homogeneity. The system embodiment may also include a filter logic to produce a data set having a second degree of homogeneity by filtering the spatially dependent filtered data set. The second degree of homogeneity may be greater than the first degree of homogeneity and may indicate spatial independence.

15 Claims, 6 Drawing Sheets

CONSTANT VARIANCE FILTER

CROSS REFERENCE TO RELATED APPLICATIONS

This application claims the benefit of U.S. Provisional Application titled "Constant Variance Filter", Ser. No. 60/817,310 filed Jun. 29, 2006.

COPYRIGHT NOTICE

A portion of the disclosure of this patent document contains material that is subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Similarity measures (e.g., mutual information) used in intensity based registration suffer from a scalloping artifact that gives rise to local maxima. Scalloping occurs due to noise reduction filtering that occurs when image samples are interpolated. At certain scales there may also be fluctuations in the similarity surface due to interpolation of the signal and to sampling of a continuous, band-limited image signal. This phenomenon can even bias global maxima, leading to inaccurate registrations. The phenomenon is seen when an image is registered onto itself with different noise realizations but is absent when the same noise realization is present in both images.

Registration of two medical data sets is a common task in medical imaging. One floating image or volume is spatially transformed to match a reference image or volume. In intensity-based registration, a transformation that optimizes a similarity measure is found. The similarity measure quantifies the alignment of two data sets. Various optimization algorithms are used to maximize similarity measures including mutual information, cross-correlation, and so on. Registration includes interpolating a reference image at locations corresponding to locations in the newly transformed floating image. Linear interpolation is often chosen for simplicity and speed.

Intensity based registration methods involve finding an optimal transformation, which in turn involves optimizing a similarity measure that quantifies the alignment of the two data sets. Intensity based registration method similarity measures suffer from a scalloping artifact in the similarity surface. This artifact produces local maxima. The artifacts induced by linear interpolation are caused by a partial volume effect and uneven filtering. Interpolation methods induce uneven data filtering and affect variance. Examining noise effects illustrates that noise variance is not spatially constant following interpolation.

Medical imaging may involve registering two medical data sets. The images and/or volumes may be magnetic resonance images (MRI). The images may be acquired by different modalities, for example, magnetic resonance (MR) and computed tomography (CT). The images and/or volumes may also be provided, for example, from contrast enhanced MRI, functional MRI, and so on. Registration may also be performed outside the medical imaging field, (e.g., satellite imaging, spatial imaging, applications where images are tiled). Thus, undesired results associated with interpolation and registration may also occur in these fields.

Registration involves trying to line up two images. If the two images line up exactly, then interpolation may not be required. If the two images are misaligned by an integral amount (e.g., one pixel) then interpolation may also not be required since a simple shift can be made. However, when the two images do not line up exactly and are not misaligned by an integral amount, then one image may have to be moved by a non-integral amount (e.g., half a pixel). In this case, an estimation of a value may have to be made. In one case, the estimation may be made by a linear interpolation, which may average the values found at a number of (e.g. two) neighboring grid locations in the image to be moved. If a registration transformation involves rotation, then some pixels (e.g., those that fall on a grid) of an image may not require interpolation while other pixels (e.g., those that fall between the grid) may require interpolation. Thus, some parts of the image may be filtered and some other parts may be unchanged. This phenomenon may also occur in non-rigid registration where some parts of an image are transformed differently than some other parts.

Interpolation is a form of a spatially dependent filter. In a spatially dependent filter, if a point falls on a grid, it is filtered one way while if the point does not fall on a grid it is filtered another way. This spatial dependence may lead to the undesired effects described above.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DETAILED DESCRIPTION

Example systems and methods described herein relate to a constant variance filter. A constant variance filter (cv-filter) may produce several desirable effects. A cv-filter may reduce registration error. For example, a cv-filter may decrease the standard deviation of registration errors and the average registration (Q-Newton methods with MI, no noise). Cv-filters may also improve the accuracy of a registration angle. A cv-filter may make registration more robust, as determined by the percentage of trials giving errors <1 pixel. A cv-filter may be less computationally expensive than conventional systems. Since fewer iterations may be required, overall central processing unit (CPU) time may decrease in some instances, for example with Q-Newton optimization.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Data store", as used herein, refers to a physical and/or logical entity that can store data. A data store may be, for example, a database, a table, a file, a list, a queue, a heap, a memory, a register, a disk, and so on. In different examples a data store may reside in one logical and/or physical entity and/or may be distributed between multiple logical and/or physical entities.

"Logic", as used herein, includes but is not limited to hardware, firmware, software in execution and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. Where multiple logical logics are described, it may be possible in some examples to incorporate the multiple logical logics into one physical logic. Similarly, where a single logical logic is described, it may be possible in some examples to distribute that single logical logic between multiple physical logics.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

"User", as used herein, includes but is not limited to, one or more persons, software, computers or other devices, or combinations of these.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

Linear interpolation corresponds to a filter that depends on interpolation location. For example, interpolation may produce filtering in the middle of grid points (e.g., $\alpha=0.5$) and no filtering at grid points (e.g., $\alpha=0,1$). A cv-filter facilitates correcting "errors" produced by a spatially dependent filter. Errors resulting from spatially dependent filters may include local maxima and minima caused by scalloping artifacts. In one example, the constant variance filter may leave a data value unaltered when an image is moved by a pixel ($0<\alpha<1$), but may manipulate a value when an image is moved by 0 or 1 pixels.

Spatially dependent filters, (e.g., linear interpolation) depend on interpolation location. Though cv-filters also depend on interpolation location, a cv-filter produces a different effect than linear interpolation. For example, a cv-filter may produce no filtering in the middle of grid points and filtering at the grid points. Using the cv-filter before and/or after linear interpolation facilitates producing a signal with a constant variance independent of the interpolation location.

For linear interpolation, local maxima and global bias may be removed by filtering the interpolated image using a cv-filter. This filter may equalize the variance across the interpolated image. Reducing local and biased maxima may lead to more robust and accurate image registration.

Thus, in one example, the cv-filter is a filter that reduces artifacts induced by interpolation (e.g., linear interpolation) that occurs as a part of image registration. The cv-filter may reduce bias on global maximum and may remove local minima and maxima. The cv-filter may be applied after interpolation to make data more spatially homogenous. The cv-filter may also be applied before interpolation.

In one example, a cv-filter for linear interpolation (cv-lin filter) equalizes variance across a linearly interpolated image, which facilitates removing local minima and global bias. Local minima and global bias may challenge optimization algorithms. Therefore, removing local minima and global bias may lead to more accurate results. Constant variance filters may also be provided for cubic interpolation (cv-cub filter), spline interpolation (cv-spline filter), and so on.

One embodiment provides filtering to reduce local maxima and global bias due to noise. The filtering may depend, at least in part, on characterizing artifacts in mutual information and cross-correlation surfaces arising from noise-interpolation, signal-interpolation, and sampling.

Medical registration may be performed on three dimensional data. Thus, in one example, a cv-lin filter may be extended to three dimensions. In some examples, cv-lin filters may be extended to four dimensions (e.g., x, y, z, time) in applications where multiple images are acquired over time (e.g., functional MRI). Similarly, medical image registration may be performed using rotation or more general non-rigid transformations. In those cases, a may be specified differently at different locations.

Cv-lin filters may remove artifacts induced by interpolation. On a regularly spaced lattice, $j \in \{1, \ldots, N\}$, an arbitrary location can be written as a shift over an integer number of lattice grid plus a real number for in-between the lattice grid. By way of example, a value of a discrete signal $s_j$ defined on a regularly spaced lattice may be written as a shift on to the value of $s_j$ at a different location also defined over a regularly spaced lattice. For a shift by $\alpha \subset [0,1]$, with $i=j+\alpha$, and $j \in$ {the set of real numbers}, after linear interpolation, the new signal $x_i$ can be written:

$$x_i = (1-\alpha)s_j + \alpha s_{j+1} \quad (1)$$

Figure 1A:
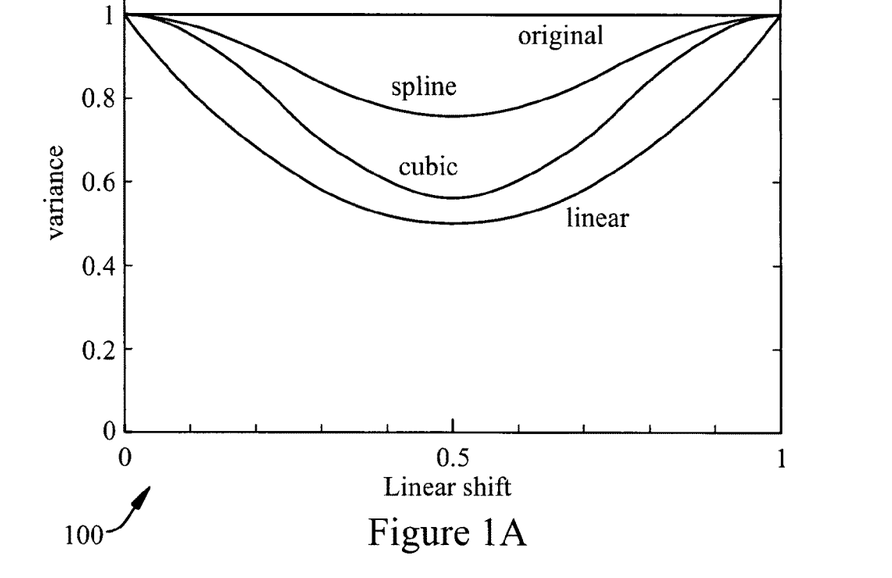
FIG. 1 illustrates variance in the context of interpolated signals.
Figure 1B:
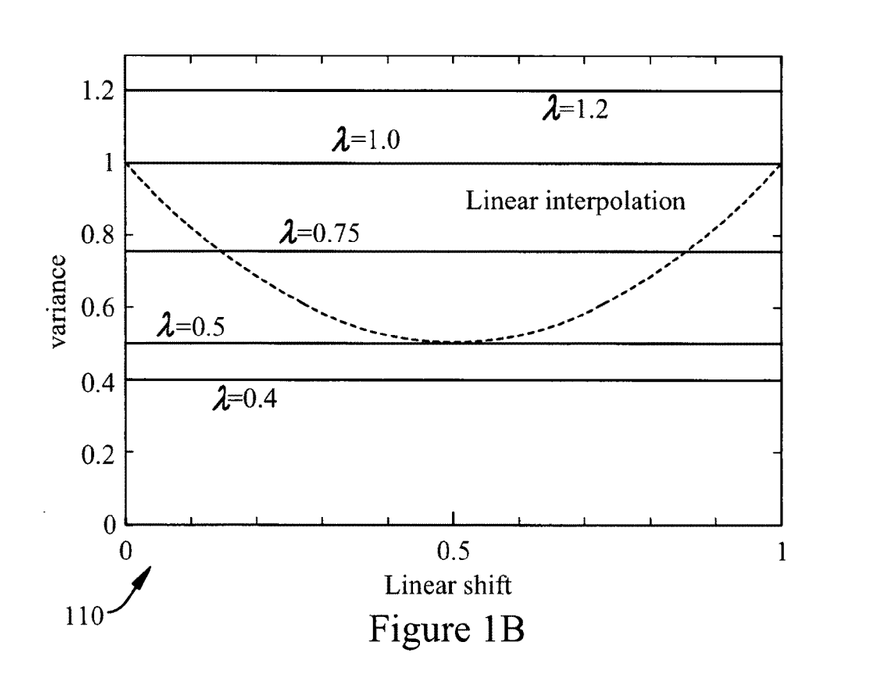

Equation (1) can be interpreted as an adaptive linear filter. For $\alpha=0$ or $1$, a simple shift of the lattice is performed. However, when $\alpha=0.5$ for example, the filter corresponds to an averaging filter over two points. When $\alpha=0$ or $1$, the value of the signal is unchanged, aside from edge problems. When $\alpha \neq 0$ or $1$, the variance of the signal is reduced. More complicated filters (e.g., cubic, spline) may experience a similar effect. FIG. 1 illustrates at 100 computing the variance of a signal as a function of distance between the original grid points. Different interpolation methods generate attenuations different from the unity variance of the original signal. Different interpolation methods give a minimum at $\alpha=0.5$ where filtering is maximal. The closer the interpolation kernel is to the ideal sinc, the closer the variance is to the original constant one.

The variance following linear interpolation depends on location between samples. Therefore, a filter can be designed that will also depend on the interpolation location. This filter will produce a different behavior (e.g., no filtering in the middle of grid points, filtering near the original grid points). Applying this filter after linear interpolation would result in a signal with constant variance across space, independent of the interpolation location. In one example these criteria describe a constant variance filter for linear interpolation (cv-lin filter). In one embodiment, to minimize computation, a non-causal filter can be described according to:

$$y_i = ax_{i-1} + bx_i + ax_{i+1} \quad (2)$$

where x values are samples on the new interpolated grid and y values are values after application of a cv-lin filter. A normalization constraint can be applied according to:

$$2a + b = 1 \text{ or } a = \frac{1-b}{2} \quad (3)$$

In one example, a and b can be specified so that $\sigma_y^2 = \lambda \sigma_s^2$ with $\sigma_y^2$ and $\sigma_s^2$ the variance of y and s respectively, with $\lambda$ being a user-defined constant and a member of the positive real numbers Using Equations 1-3, an equation for the variance following interpolation may be derived. The original signal s on the grid is interpolated to create x (Equation 1) and filtered to create y (Equation 2). The variance of y may be expressed as a function of the variance of the original noise signal s. With $E\{\}$ representing the expectation over the entirety of data, the variance of the observed signal y may be obtained as a function of x using Equation (2):

$$E\{(y-\bar{y})^2\} = E\{(a(x_{i-1}-\bar{y}) + b(x_i-\bar{y}) + \bar{y}(b+2a-1))^2\} \quad (4)$$

Using the normalization constraint, Equation (3), and recognizing that $\bar{y}=\bar{x}=\bar{s}$, this becomes:

$$E\{(y-\bar{y})^2\} a^2 E\{(x_{i-1}-\bar{x})^2\} + 2abE\{(x_{i-1}-\bar{x})\} + 2a^2 E\{(x_{i-1}-\bar{x})(x_{i+1}-\bar{x})\} + \ldots b^2 E\{(x_i-\bar{x})^2\} + a^2 E\{(x_{i+1}-\bar{x})^2\} + 2abE\{(x_i-\bar{x})(x_{i+1}-\bar{x})\} \quad (5)$$

Assuming the variance to be spatially invariant, the variance of x, and similarly for s, can be approximated by:

$$E\{(x_{--}-\bar{x})^2\} \approx E\{(x_i-\bar{x})^2\} \approx E\{(x_{i-1}-\bar{x})^2\} \approx E\{(x_{i+1}-\bar{x})^2\} \approx \sigma_x^2 \quad (6)$$

Using Equation (1) the variance can be obtained as a function of s:

$$\begin{aligned}
\sigma_x^2 &= E\{(x_i - \bar{x})^2\} \quad (7)\\
&= E\{((1-\alpha)s_i + \alpha s_{i+1} - \bar{s})^2\}\\
&= E\{((1-\alpha)(s_i - \bar{s}) + \alpha(s_{i+1} - \bar{s}))^2\}\\
&= (1-\alpha)^2 E\{(s_i - \bar{s})^2\} + \alpha^2 E\{(s_{i+1} - \bar{s})^2\} + \\
&\quad 2\alpha(1-\alpha)E\{(s_i - \bar{s})(s_{i+1} - \bar{s})\}
\end{aligned}$$

Since it is assumed that s is uncorrelated noise, it becomes for $i \neq j$:

$$E\{(s_i-\bar{s})(s_j-\bar{s})\}=0 \text{ and } E\{(s_i-\bar{s})^2\}=\sigma_s^2 \quad (8)$$

Equation (7) is equivalent to:

$$\sigma_x^2 = ((1-\alpha)^2 + \alpha^2)\sigma_s^2 = [2(\alpha-0.5)^2 + 0.5]\sigma_s^2 \quad (9)$$

Computing the covariance terms in Equation (5), using Equation (1):

$$\begin{aligned}
E\{(x_{i-1} - \bar{x})(x_i - \bar{x})\} &= \quad (10)\\
E\{((1-\alpha)s_{i-1} + \alpha s_i - \bar{s})((1-\alpha)s_i + \alpha s_{i+1} - \bar{s})\} &= \\
(1-\alpha)^2 E\{(s_{i-1} - \bar{s})(s_i - \bar{s})\} + \alpha(1-\alpha)E\{(s_{i-1} - \bar{s})(s_{i+1} - \bar{s})\} + \\
\alpha(1-\alpha)E\{(s_i - \bar{s})^2\} + \alpha^2 E\{(s_i - \bar{s})(s_{i+1} - \bar{s})\}
\end{aligned}$$

Substituting Equation (8) into Equation (10):

$$E\{(x_{i-1}-\bar{x})(x_i-\bar{x})\} = E\{(x_i-\bar{x})(x_{i+1}-\bar{x})\} = \alpha(1-\alpha)\sigma_s^2 \quad (11)$$

Since two point interpolation is being used, the result is:

$$E\{(x_{i-1}-\bar{x})(x_{i+1}-\bar{x})\}=0 \quad (12)$$

Finally using Equations (12), (11), and (9), (5) simplifies to:

$$E\{(y-\bar{y})^2\} 2a^2 \sigma_x^2 + 4ab\alpha(1-\alpha)\sigma_s^2 + b^2 \sigma_x^2 \quad (13)$$

Rearranging terms produces;

$$E\{(y-\bar{y})^2\} = [(2a^2+b^2)(2(\alpha-0.5)^2) + 4ab\alpha(1-\alpha)]\sigma_s^2 \quad (14)$$

If it is desired to have the variance after interpolation to be $E\{(y-\bar{y})^2\}=\lambda\sigma_s^2$, Equation (14) gives:

$$\lambda = [(2a^2+b^2)(2(\alpha-0.5)^2+0.5) + 4ab\alpha(1-\alpha)] \quad (15)$$

Substituting a using (3) and defining C and D as specified below, yields to the second order equation:

$$b^2(3C/2 - 2D) + b(2D - C) + C/2 - \lambda = 0 \qquad (16)$$

$$\begin{cases} C = (2(\alpha - 0.5)^2 + 0.5) \\ D = \alpha(1 - \alpha) \end{cases}$$

Equation (16) has two solutions. One of the two solutions corresponds to a filter that inverts the signal, and thus only the solution with the positive sign is kept:

$$\hat{b} = \frac{(C - 2D) \pm \sqrt{4D^2 - 2C^2 + 6\lambda C - 8\lambda D}}{3C - 4D} \qquad (17)$$

Under the constraints for C and D from Equation (16), the denominator exists for every $\alpha \subset [0,1]$, and the square root is positive for $\alpha > \frac{1}{3}$. The value $\alpha = \frac{1}{3}$ corresponds to the minimal variance achievable with a three-point averaging filter; (e.g., [1 1 1]/3). Given the value of b, one can compute a, and specify the filter coefficients in (2).

FIG. 1 illustrates at 110 computing variance using a Monte Carlo method with linear interpolation and with linear interpolation followed by cv-lin filtering with various λ values. Following application of a cv-lin filter, variance is flat. With λ=0.5, the signal is left unchanged when it is the most filtered by linear interpolation (e.g., in the middle of grid points). By choosing λ>0.5, cv-lin filter becomes a high-pass filter where the variance has been attenuated by linear interpolation more than 0.5. Extension to multidimensional data involves filtering dimensions independently. There will be as many α's as dimensions.

To decrease computational time, the filtering can be re-written so that overhead is reduced. The original filtering equation is $$y = [aba] * [(1-\alpha)\alpha] * s \qquad (18)$$

where * denotes convolution. Equation (18) can be written as:

$$y = [(1-\alpha)\alpha] * ([0.5\ 0\ 0.5] + b[-0.5\ 1\ -0.5]) * s \qquad (19)$$

When $f(\alpha,\lambda) = b$, this equation simplifies further to:

$$y = ((1-\alpha) + \alpha Z^{+1}) * (s1 + f(\alpha,\lambda)s2) \qquad (20)$$

with:

$$s1 = [0.5\ 0\ 0.5] * s \qquad (21)$$
$$s2 = [-0.5\ 1\ -0.5] * s$$

s1 and s2 are new datasets that can be computed prior to registration and correspond to a low-pass and a high-pass version of the original dataset. During the registration, a simple linear combination of s1 and s2 is computed before linear interpolation using the coefficient $f(\alpha,\lambda)$ as in (20). The computational cost is therefore reduced to computing $f$ and one addition and one multiplication per pixel. Equivalent in the 1D case to a three point filters. The function $f$ is constant for all pixels in case of translation and different for every pixel when rotation is used. The value of $f$ could be stored in a lookup table.

If 2D two values for alpha are used, $\alpha_{ne}$ and $\alpha_{ns}$ for the east-west and north-south directions respectively, then Equation (18) becomes:

$$y = [a_{ew}b_{ew}a_{ew}] * [a_{ns}b_{ns}a_{ns}]^T * [(1-\alpha_{ew})\alpha_{ew}] * [(1-\alpha_{ns})\alpha_{ns}]^T * s \qquad (22)$$

which can be re-written similarly to the 1D case as:

$$y = [(1-\alpha_{ew})\alpha_{ew}] * [(1-\alpha_{ns})\alpha_{ns}]^T * (s1 + f(\alpha_{sn},\lambda)s2 + f(\alpha_{ew},\lambda)s2 + f(\alpha_{ew},\lambda)f(\alpha_{ns},\lambda)s4) \qquad (23)$$

with:

$$s1 = [0.5\ 0\ 0.5] * [0.5\ 0\ 0.5]^T s \qquad (24)$$
$$s2 = [0.5\ 0\ 0.5] * [-0.5\ 1\ -0.5]^T * s$$
$$s3 = [-0.5\ 1\ -0.5] * [0.5\ 0\ 0.5]^T * s$$
$$s4 = [-0.5\ 1\ -0.5] * [-0.5\ 1\ -0.5]^T * s$$

for images that are computed prior to registration.

Figure 2A:
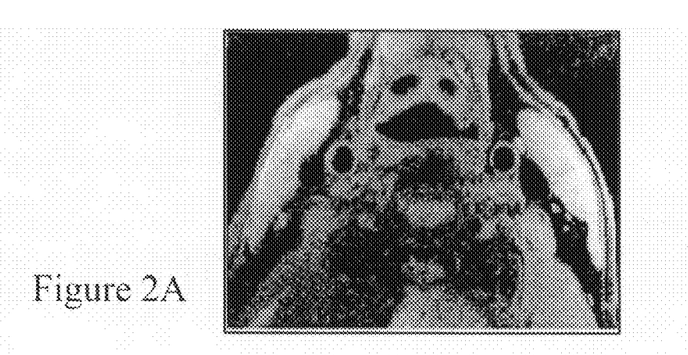
FIG. 2 illustrates a scalloping artifact obtained with identical noise realizations in two images.
Figure 2B:
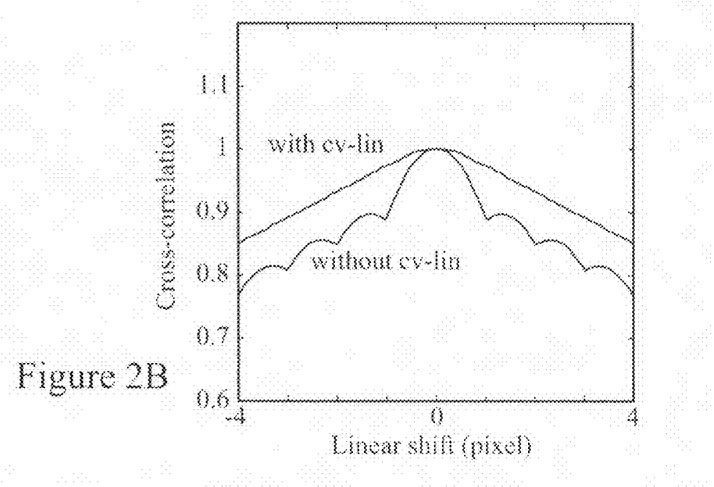
Figure 2C:
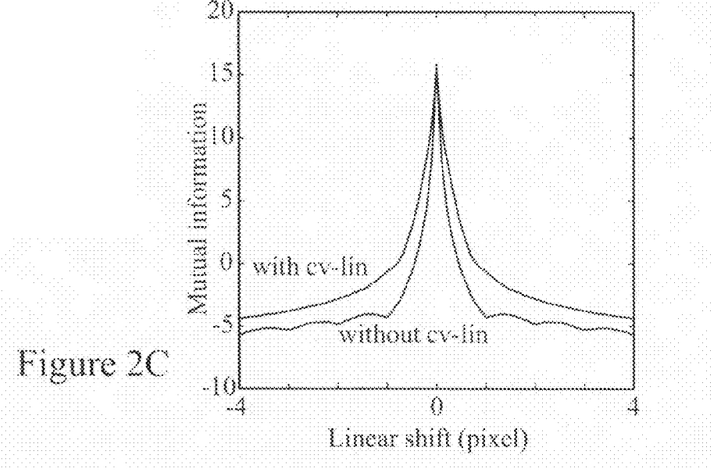
Figure 3A:
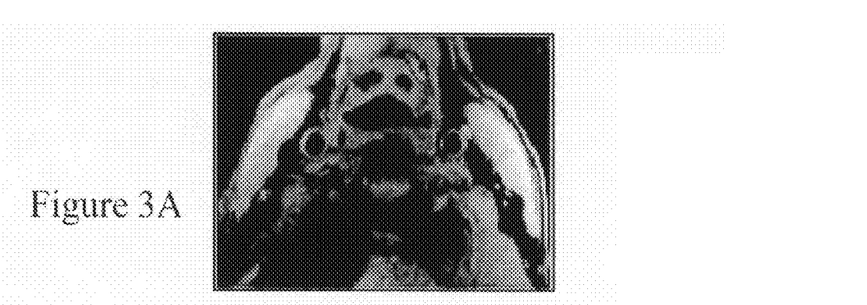
FIG. 3 illustrates global maxima removal using a constant variance filter.
Figure 3B:
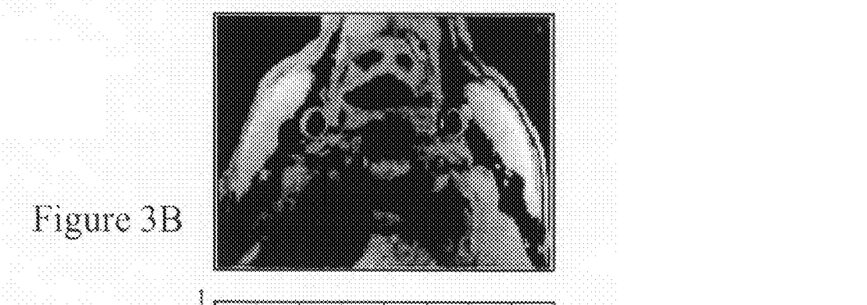
Figure 3C:
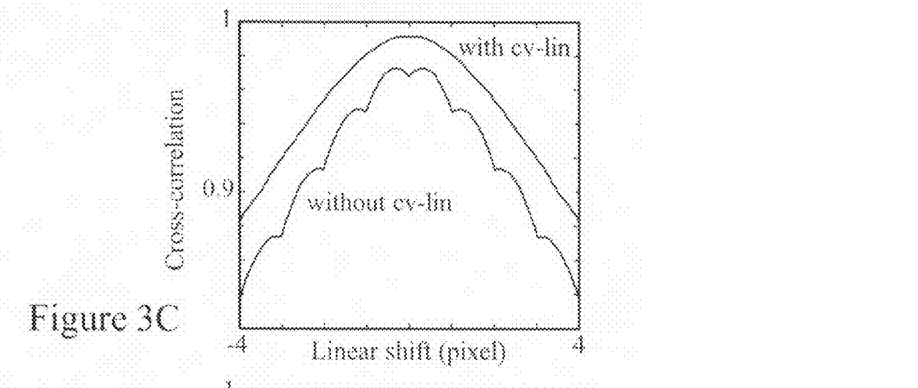
Figure 3D:
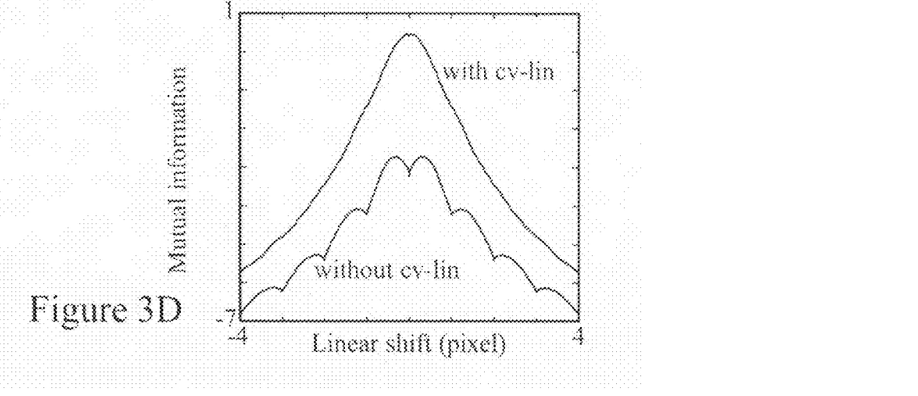

Cv-filters may be used to remove local maxima from a similarity surface. FIG. 2 plots MI and cross-correlation similarity measures as a function of linear shift, with and without application of cv-lin. In FIG. 2, an original, noisy image was copied and mis-registered. The large scalloping artifacts that are present with these noisy images are illustrated as being suppressed with the application of a cv-lin filter. At distances far from the global peak, local maxima tend to occur halfway between discrete pixel locations. This corresponds to the location of minimum variance in FIG. 1.

Cv-filters may also be used to remove global bias from a similarity surface. FIG. 3 illustrates the results of using two low-noise images and adding different noise realizations to each to achieve SNR (signal to noise ratio) comparable to the original image. Prior to application of a cv-lin filter, global maxima are found at ±0.3 pixel. These biased global maxima are removed with the application of a cv-lin filter. Local "scalloping" maxima are also removed, in a manner similar to that in FIG. 2. Note that the cross-correlation equals one at the maximum in FIG. 2, but falls short of this ideal when different noise realizations are applied in FIG. 3. In this example, original "low noise" images were obtained using anisotropic diffusion noise reduction filtering.

Figure 4:
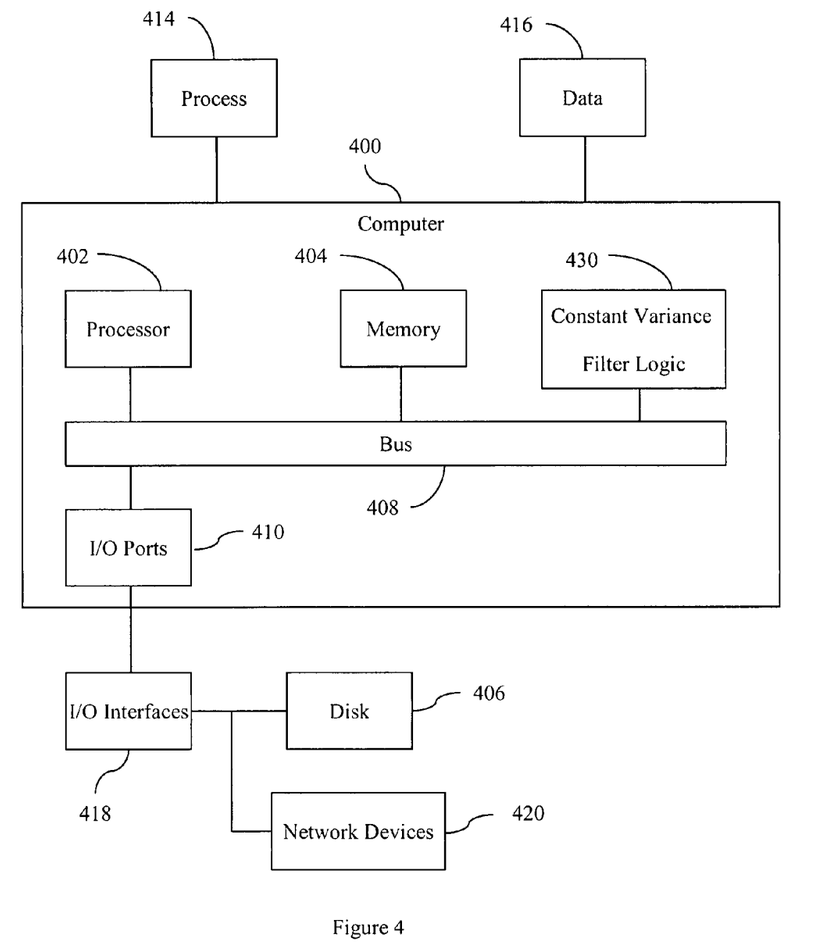
FIG. 4 illustrates an example computing environment in which example systems and methods described herein may operate.

FIG. 4 illustrates an example computing device in which example systems and methods described herein, and equivalents, may operate. The example computing device may be a computer 400 that includes a processor 402, a memory 404, and input/output ports 410 operably connected by a bus 408. In one example, the computer 400 may include a constant variance filter logic 430 configured to facilitate mitigating the effects of spatially dependent filtering due to interpolation. In different examples, the logic 430 may be implemented in hardware, software, firmware, and/or combinations thereof. While the logic 430 is illustrated as a hardware component attached to the bus 408, it is to be appreciated that in one example, the logic 430 could be implemented in the processor 402.

The filter logic 430 may provide means (e.g. hardware, software, firmware) for applying a spatially dependent filter to a data set to produce a spatially independent data set. In one example, filter logic 430 may provide means for storing a spatially dependent filter set. In another embodiment, filter logic 430 may provide means for producing a spatially independent filtered data set. Filter logic 430 may also provide means for registering an image.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, and/or a memory stick. Furthermore, the disk 406 may be a CD-ROM, a CD recordable drive (CD-R drive), a CD rewriteable drive (CD-RW drive), and/or a digital video ROM drive (DVD ROM). The memory 404 can store a process 414 and/or a data 416, for example. The disk 406 and/or the memory 404 can store an operating system that controls and allocates resources of the computer 400.

The bus 408 may be a single internal bus interconnect architecture and/or other bus or mesh architectures. While a single bus is illustrated, it is to be appreciated that the computer 400 may communicate with various devices, logics, and peripherals using other busses (e.g., PCIE, SATA, Infiniband, 1394, USB, Ethernet). The bus 408 can be types including, for example, a memory bus, a memory controller, a peripheral bus, an external bus, a crossbar switch, and/or a local bus.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a local area network (LAN), a wide area network (WAN), and other networks.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

Figure 5:
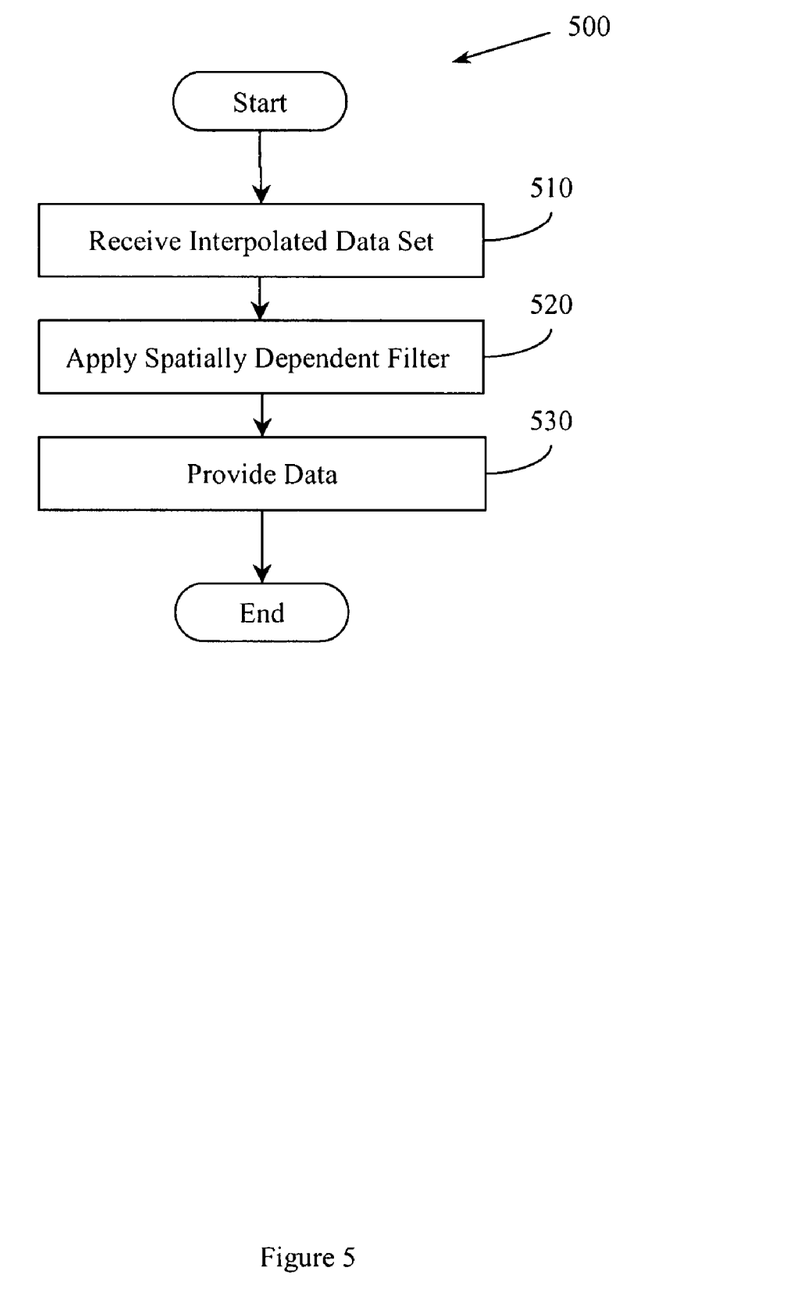
FIG. 5 illustrates an example method associated with a constant variance filter.

FIG. 5 illustrates an example method 500 associated with a constant variance filter. Method 500 may be a computer-implemented method for mitigating the effects of spatially dependent filtering due to interpolation. Method 500 may include, at 510, receiving an interpolated data set. The data set may be received, for example, from an interpolation logic that has interpolated an MR image. While an MR image is described, it is to be appreciated that the data set may be associated with other imaging apparatus. Method 500 may also include, at 520, applying a spatially dependent filter to the interpolated data set to produce a spatially independent filtered data set.

Method 500, at 520, may achieve a spatially independent data set by applying a cv-lin filter. The interpolated data set received at 510 may be the result of a spatially dependent filter (e.g. linear interpolation) applied to a data set. A cv-lin filter is also a spatially dependent filter, however it produces an opposite effect to linear interpolation. For example, a cv-lin filter may filter data at locations where linear interpolation uses no filtering, and may leave data unaltered at locations where linear interpolation applies filtering. Therefore, applying a cv-lin filter before or after linear interpolation may yield a signal with constant variance, independent of filter location. In one example, producing a spatially independent data set may involve execution computer executable instructions. The computer executable instructions may perform some actions associated with the processing described in Equations (1) through (24). Method 500 may also include, at 530, providing the spatially independent filtered data set to a registration logic, to a signal detection logic, and so on.

Figure 6:
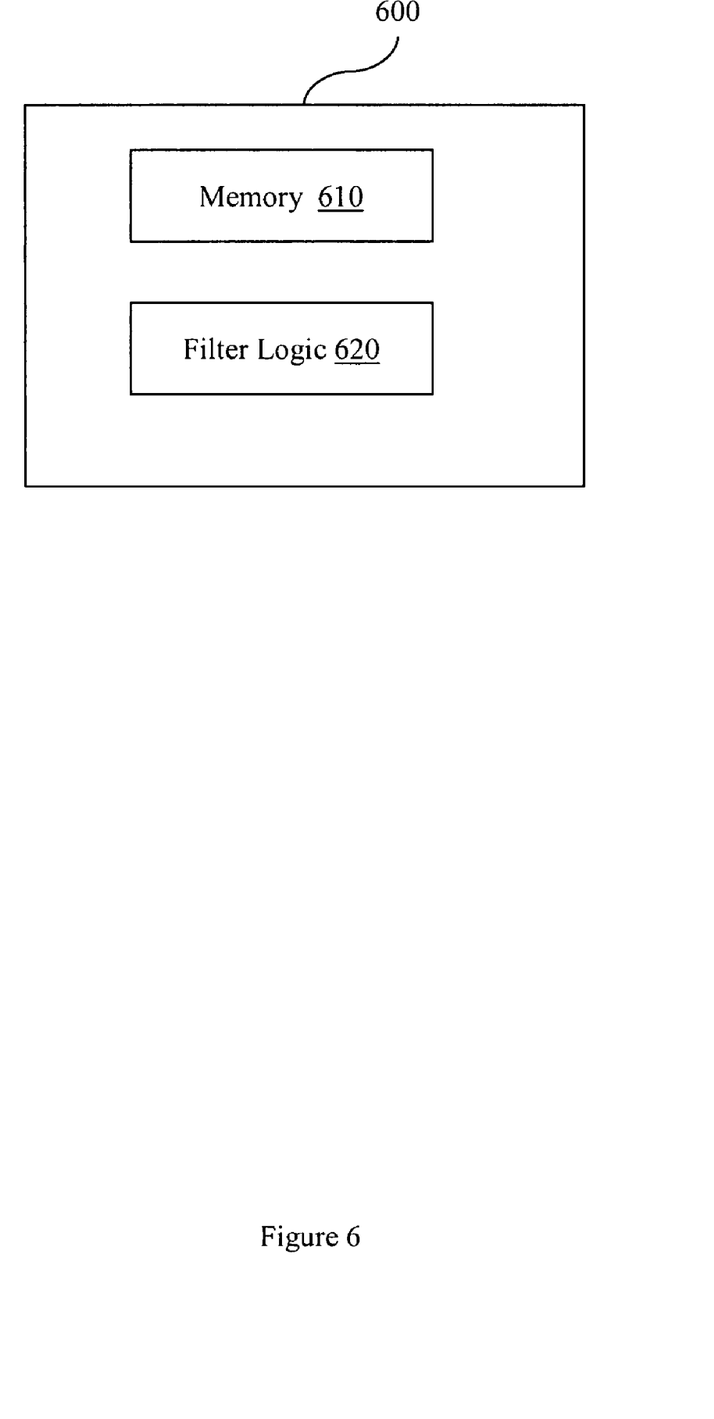
FIG. 6 illustrates an example system associated with a constant variance filter.

FIG. 6 illustrates an example system 600 associated with a constant variance filter. In one example, system 600 may include a receive logic 610 to receive a spatially dependent filtered data set and a filter logic 620 to produce a spatially independent data set from the spatially dependent filtered data set. In one example, the system 600 may also include a registration logic to register two images based, at least in part, on the spatially independent data set.

The filter logic 620 may produce a spatially independent data set by applying a spatially dependent filter. The spatially dependent data set received by the memory 610 may be the product of a first spatially dependent filter applied to a data set. Filter logic 620 may apply a second spatially dependent filter to produce a spatially independent data set. For example, the second spatially dependent filter may filter at locations where the first spatially dependent filter leaves data unaltered, and may not filter at locations where the first spatially dependent filter manipulates data. The resulting data set produced by filter logic 620 is a spatially independent data set. Filter logic 620 may store the independent data set in a memory. The filter logic 620 may perform some actions associated with the processing described in Equations (1) through (24).

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
    a memory to store a spatially dependent filtered data set having a first degree of homogeneity; and
    a filter logic to filter the spatially dependent filtered data set using a constant variance filter that depends on interpolation location to produce a data set having a second degree of homogeneity, where the data set having the second degree of homogeneity indicates spatial independence having a constant variance.

2. The system of claim 1, the second degree of homogeneity being greater than the first degree of homogeneity.

3. The system of claim 1, comprising a registration logic to register two images based, at least in part, on the data set having spatial independence.

4. The system of claim 1, the spatially dependent filtered data set being provided by a magnetic resonance imaging machine.

5. A method, comprising:
    receiving a data set from a magnetic resonance imaging machine;
    applying a first spatially dependent filter to the data set to produce a spatially dependent data set, where the first spatially dependent filter interpolates the data set; and
    applying a second spatially dependent filter to the spatially dependent data set to produce a more spatially homogenous data set than the spatially dependent data set, where the second spatially dependent filter is a constant variance filter.

6. The method of claim 5, the data set being received directly from the magnetic resonance imaging machine.

7. The method of claim 5, where the spatially dependent filter interpolates the data set using one of, a linear interpolation, a cubic interpolation, and a spline interpolation.

8. The method of claim 5, the constant variance filter removing from the data set at least one of a local minima, a local maxima, a scalloping effect, and an arch type artifact.

9. The method of claim 5, the received data set including three dimensional data.

10. The method of claim 5, comprising providing the more spatially homogeneous data set to a registration logic.

11. A system, comprising:
    means for storing a spatially dependent filtered data set;
    means for producing a spatially independent filtered data set by applying a spatially dependent filter to the spatially dependent filtered data set, where the spatially dependent filter is a constant variance filter; and
    means for registering an image related to the independently filtered data set with a second image.

12. The system of claim 11, the spatially dependent data set representing a manipulated magnetic resonance image.

13. The system of claim 11, the magnetic resonance image being manipulated by interpolation.

14. The system of claim 11, where applying a spatially dependent filter includes applying at least one of linear interpolation, spline interpolation and cubic interpolation.

15. The system of claim 11, the spatially dependent filtered data set being a data set in n-dimensions, where n is a member of the set of integers.

* * * * *

UNITED STATES PATENT AND TRADEMARK OFFICE
CERTIFICATE OF CORRECTION

PATENT NO. : 8,059,907 B2
APPLICATION NO. : 11/824572
DATED : November 15, 2011
INVENTOR(S) : Wilson et al.

Page 1 of 1

It is certified that error appears in the above-identified patent and that said Letters Patent is hereby corrected as shown below:

Specification:

In column 6, line 67, delete "yields to the" and insert --yields the--.

In column 6, equation 5, delete " $E\{(y-\bar{y})^2\}a^2E\{(x_{i-1}-\bar{x})^2\}+2abE\{(x_{i-1}-\bar{x})\}+2a^2E\{(x_{i-1}-\bar{x})(x_{i+1}-\bar{x})\}+\ldots b^2E\{(x_i-\bar{x})^2\}+a^2E\{(x_{i+1}-\bar{x})^2\}+2abE\{(x_i-\bar{x})(x_{i+1}-\bar{x})\}$ "

and insert -- $E\{(y-\bar{y})^2\} = a^2E\{(x_{i-1}-\bar{x})^2\}+2abE\{(x_{i-1}-\bar{x})(x_i-\bar{x})\}+2a^2E\{(x_{i-1}-\bar{x})(x_{i+1}-\bar{x})\}+\ldots b^2E\{(x_i-\bar{x})^2\}+a^2E\{(x_{i+1}-\bar{x})^2\}+2abE\{(x_i-\bar{x})(x_{i+1}-\bar{x})\}$ --.

In column 6, equation 13, delete " $E\{(y-\bar{y})^2\}2a^2\sigma_x^2+4ab\alpha(1-\alpha)\sigma_x^2+b^2\sigma_x^2$ "

and insert -- $E\{(y-\bar{y})^2\} = 2a^2\sigma_x^2 + 4ab\alpha(1-\alpha)\sigma_x^2 + b^2\sigma_x^2$ --.

In column 8, equation 23, delete " $y=[(1-\alpha_{ew})\alpha_{ew}]*[(1-\alpha_{ns})\alpha_{ns}]^T*(s1+f(\alpha_{sn},\lambda)s2+f(\alpha_{ew},\lambda)s2+f(\alpha_{ew},\lambda)f(\alpha_{ns},\lambda)s4)$ "

and insert -- $y=[(1-\alpha_{ew})\ \alpha_{ew}]*[(1-\alpha_{ns})\ \alpha_{ns}]^T*(s1+f(\alpha_{sn},\lambda)s2+f(\alpha_{ew},\lambda)s3+f(\alpha_{ew},\lambda)f(\alpha_{ns},\lambda)s4)$ --.

Signed and Sealed this
Twenty-seventh Day of March, 2012

David J. Kappos
*Director of the United States Patent and Trademark Office*